(12) United States Patent
Razack et al.

(10) Patent No.: US 10,388,968 B2
(45) Date of Patent: Aug. 20, 2019

(54) FUEL CELL MICROPOROUS LAYER HAVING MULTIPLE DENSITIES

(71) Applicant: AUDI AG, Ingolstadt (DE)

(72) Inventors: Siddique Ali Khateeb Razack, Darien, IL (US); Robert Mason Darling, South Windsor, CT (US)

(73) Assignee: AUDI AG, Ingolstadt (DE)

( * ) Notice: Subject to any disclaimer, the term of this patent is extended or adjusted under 35 U.S.C. 154(b) by 229 days.

(21) Appl. No.: 15/111,155

(22) PCT Filed: Jan. 16, 2014

(86) PCT No.: PCT/US2014/011809
§ 371 (c)(1),
(2) Date: Jul. 12, 2016

(87) PCT Pub. No.: WO2015/108519
PCT Pub. Date: Jul. 23, 2015

(65) Prior Publication Data
US 2016/0344042 A1 Nov. 24, 2016

(51) Int. Cl.
*H01M 8/0245* (2016.01)
*H01M 8/1018* (2016.01)

(52) U.S. Cl.
CPC ....... *H01M 8/0245* (2013.01); *H01M 8/1018* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 6,733,915 B2 | 5/2004 | Barton et al. | |
| 8,430,985 B2 | 4/2013 | Owejan et al. | |
| 2004/0058223 A1* | 3/2004 | Shibata | H01M 4/8605 |
| | | | 429/480 |
| 2009/0148726 A1 | 6/2009 | Ji et al. | |
| 2014/0127606 A1 | 5/2014 | Kuwata et al. | |
| 2016/0219586 A1* | 7/2016 | Floch | H04W 28/065 |
| 2016/0329586 A1* | 11/2016 | Ninan | H01M 8/0241 |

FOREIGN PATENT DOCUMENTS

| | | | |
|---|---|---|---|
| GB | 2521677 | * | 7/2015 |
| JP | 2008-198567 A | | 8/2008 |
| JP | 2008198567 | * | 8/2008 |
| KR | 10-2008-0047765 A | | 5/2008 |

OTHER PUBLICATIONS

JP2008198567 English translation. Okamiya et al. Japan. Aug. 2008 (Year: 2008).*

* cited by examiner

*Primary Examiner* — Christopher P Domone
(74) *Attorney, Agent, or Firm* — Seed Intellectual Property Group LLP

(57) ABSTRACT

An illustrative example fuel cell component assembly includes a gas diffusion layer having a gas diffusion layer surface on one side. A microporous layer adjacent the gas diffusion layer includes a first portion having a first density and a second portion having a second density that is lower than the first density. The first portion and the second portion are arranged in a preselected pattern along the microporous layer. The first portion contacts a first section of the gas diffusion layer surface and the second portion contacts a second section of the gas diffusion layer surface.

11 Claims, 1 Drawing Sheet

FUEL CELL MICROPOROUS LAYER HAVING MULTIPLE DENSITIES

TECHNICAL FIELD

The subject matter of this document pertains to microporous layers for use in fuel cells. More particularly, the subject matter of this document pertains to microporous layers having multiple densities.

BACKGROUND

Fuel cells are useful for generating electricity based upon an electrochemical reaction. Most fuel cell arrangements include a cell stack assembly in which a plurality of cells are aligned next to each other. Each of the individual cells includes multiple layers, such as flow field plates, a membrane, electrodes, gas diffusion layers and catalyst layers.

There are various challenges associated with operating a fuel cell. Maintaining appropriate humidity levels under various operating conditions is useful for preserving the integrity of the various layers of a fuel cell. Prolonged dry operating conditions, for example, may result in compromising the integrity of the membrane or other layers of the fuel cell. Water management is also required to prevent flooding, which may reduce the power output or effectiveness of the fuel cell under certain conditions.

A particular challenge associated with addressing the various operating conditions in a fuel cell is that it is difficult to design a component to be effective under different operating conditions. Designing a component to address the concerns with one operating condition typically results in that same component introducing other problems under a different operating condition. For example, some components that are useful for high humidity situations tend to exacerbate problems associated with high temperature, low humidity conditions.

SUMMARY

An illustrative example fuel cell component assembly includes a gas diffusion layer having a gas diffusion layer surface on one side. A microporous layer adjacent the gas diffusion layer includes a first portion having a first density and a second portion having a second density that is lower than the first density. The first portion and the second portion are arranged in a preselected pattern along the microporous layer. The first portion contacts a first section of the gas diffusion layer surface and the second portion contacts a second section of the gas diffusion layer surface.

In an example assembly including one or more features of the assembly of the previous paragraph, the first portion and the second portion are symmetrically arranged on the microporous layer.

In an assembly having one or more features of the assembly of any of the previous paragraphs, the first portion and the second portion define a surface area of one side of the microporous layer, the one side is received against the gas diffusion layer surface, the first portion extends between one edge of the microporous layer and an interface between the second portion and the first portion, and the second portion extends between the interface and an opposite edge of the microporous layer.

In an example assembly having one or more features of the assembly of any of the previous paragraphs, the first portion defines approximately one-half of a surface area of one side of the microporous layer and the second portion defines approximately another half of the surface area of the one side of the microporous layer.

In an example assembly having one or more features of the assembly of any of the previous paragraphs, the first portion comprises a plurality of first segments, the second portion comprises a plurality of second segments, and at least one of the second segments is between two of the first segments.

In an example assembly having one or more features of the assembly of any of the previous paragraphs, the first density includes a first gas permeability and the second density includes a second gas permeability that is greater than the first gas permeability.

In an assembly having one or more features of the assembly of any of the previous paragraphs, the first density includes a first porosity defined by a first average pore size of pores in the first portion, the second density includes a second porosity defined by a second average pore size of pores in the second portion, and the second average pore size is greater than the first average pore size.

In an example assembly having one or more features of the assembly of any of the previous paragraphs, the first density includes a first water vapor permeability and the second density includes a second water vapor permeability that is greater than the first water vapor permeability.

In an example assembly having one or more features of the assembly of any of the previous paragraphs, one edge of the gas diffusion layer is configured to be situated near a fluid inlet through which fluid moves toward the gas diffusion layer, an opposite edge of the gas diffusion layer is configured to be situated near a fluid outlet through which fluid moves away from the gas diffusion layer, the first portion of the microporous layer is situated near the one edge, and the second portion of the microporous layer is situated near the opposite edge.

In an assembly having one or more features of the assembly of any of the previous paragraphs, at least the first density is at least partially established by compacting a material of the first portion of the microporous layer.

An illustrative example method of making a microporous layer for use in a fuel cell includes compacting a first portion of a microporous layer material to alter a density of at least the first portion of the material to establish a first density of the first portion of the microporous layer that is higher than a second density of a second portion of the microporous layer.

In an example method having one or more features of the method of the previous paragraph, the first portion and the second portion are symmetrically arranged on the microporous layer.

In an example method having one or more features of the method of any of the previous paragraphs, the first portion defines approximately one-half of the surface area of one side of the microporous layer, and the second portion defines approximately another half of the surface area of the one side of the microporous layer.

In an example method having one or more features of the method of any of the previous paragraphs, the first portion extends between one edge of the microporous layer and an interface between the second portion and the first portion, and the second portion extends between the interface and an opposite edge of the microporous layer.

In an example method having one or more features of the method of any of the previous paragraphs, the first portion comprises a plurality of first segments, the second portion comprises a plurality of second segments, and at least one of the second segments is between two of the first segments.

In an example method having one or more features of the method of any of the previous paragraphs, the first density includes a first gas permeability, and the second density includes a second gas permeability that is greater than the first gas permeability.

In an example method having one or more features of the method of any of the previous paragraphs, the first density includes a first porosity defined by a first average pore size of pores in the first portion, the second density includes a second porosity defined by a second average pore size of pores in the second portion, and the second average pore size is greater than the first average pore size.

In an example method having one or more features of the method of any of the previous paragraphs, the first density includes a first water vapor permeability, and the second density includes a second water vapor permeability that is greater than the first water vapor permeability.

The various features and advantages of disclosed example embodiments will become apparent to those skilled in the art from the following detailed description. The drawings that accompany the detailed description can be briefly described as follows.

DETAILED DESCRIPTION

Figure 1:
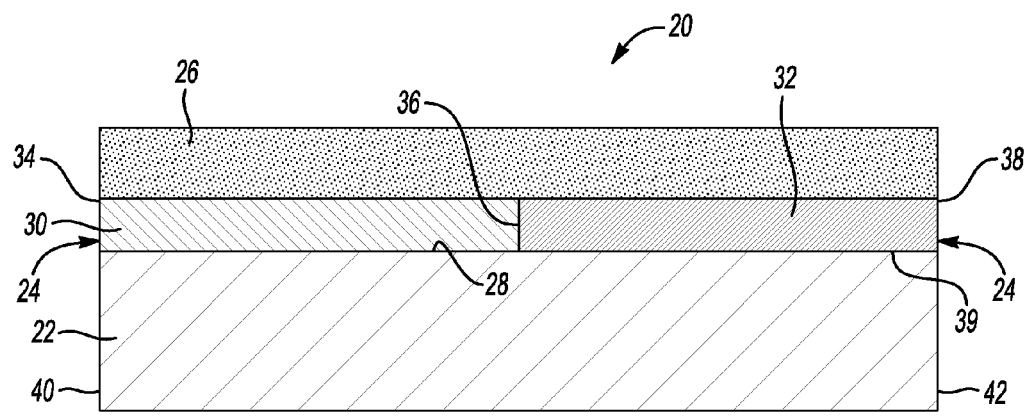
FIG. 1 is a cross-sectional, schematic illustration of an example fuel cell component assembly designed according to an embodiment of this invention.

FIG. 1 schematically shows, in cross-sectional view, an example fuel cell component assembly 20. A gas diffusion layer 22 and an adjacent microporous layer 24 are configured to facilitate movement of a fluid toward a catalyst layer 26. The gas diffusion layer 22 includes a gas diffusion layer surface 28 against which the microporous layer 24 is received. During fuel cell operation a reactant, such as hydrogen or oxygen, flows through a flow field (not illustrated), is diffused through the gas diffusion layer 22 and microporous layer 24 toward the catalyst layer 26, which is situated adjacent a membrane (not illustrated) where the electrochemical reaction takes place.

In this example, the microporous layer 24 includes a first portion 30 and a second portion 32. The first portion 30 has a first density and the second portion 32 has a second density that is lower than the first density. The first portion 30 and the second portion 32 are arranged in a preselected pattern along the microporous layer 24.

In the example of FIG. 1, the first portion 30 extends between one edge 34 of the microporous layer 24 and an interface 36 between the first portion 30 and the second portion 32. The second portion 32 extends between an opposite edge 38 of the microporous layer 24 and the interface 36. In this example, the interface 36 is approximately equally spaced from the edges 34 and 38.

In the example of FIG. 1, the first portion 30 defines approximately one-half of a surface area of a side 39 of the microporous layer 24 that is received against the gas diffusion layer surface 28. The second portion 32 defines or establishes a surface area of the other half of the side 39 of the microporous layer 24 that is received against the surface 28.

The different densities of the first portion 30 and the second portion 32 facilitate different flow characteristics across or through the microporous layer 24 to address different fuel cell operating conditions. In the example of FIG. 1, the first portion 30 is situated near one side 40 of the gas diffusion layer 22 that is configured to be situated near an inlet where fluid is introduced toward the gas diffusion layer 22.

A fuel cell manifold may define such an inlet, for example. An opposite side 42 of the gas diffusion layer 22 is configured to be situated near an outlet through which fluid moves away from the gas diffusion layer 22, for example, by exiting an adjacent flow field (not illustrated). The second portion 32 is situated near the second side 42 of the gas diffusion layer 22 in this example.

Having different densities along the microporous layer 24 provides properties that vary spatially along the microporous layer 24. These varying densities and properties or flow characteristics allow for better gas transport and water vapor transport through the microporous layer during high temperature operating conditions, for example. The density of the microporous layer influences the transport of gas species, liquid water and water vapor through the microporous layer. Having a varied density in a preselected pattern along the microporous layer allows for minimizing water vapor loss and facilitating adequate gas transport to the catalyst 26.

In the arrangement of FIG. 1, having the first portion 30 with a greater density closer to the inlet side 40 situates the portion of the microporous layer 24 that is less susceptible to water vapor loss through the microporous layer 24 at the portion where dry out may occur during fuel cell operation. Lower humidity gases entering the inlet side may tend to dry out the associated membrane, for example.

Minimizing water vapor loss by including the higher density first portion 30 near the inlet may assist in preventing dry out. Providing the lower density second portion 32 closer to the outlet side 42 allows for adequate gas transport to the catalyst 26 in a region where water vapor loss is of less concern. The lower density of the second portion 32 may allow for more water vapor loss compared to the first portion 30 but the humidity at the outlet side is typically greater than that at the inlet side so that water vapor loss is of less concern.

In other example embodiments, the second portion 32 with the lower density is situated near the inlet side and the first portion 30 with the higher density is situated near the outlet side. Some patterns allow a segment or section of each portion to be near the inlet, the outlet, or both.

The different portions with different densities in the microporous layer 24 allow for addressing potentially competing concerns during high temperature fuel cell operation. Minimizing water vapor loss while facilitating adequate gas transport is not typically possible with a microporous layer with a single density along the entire layer. The density would either be great enough to minimize water vapor loss and hinder gas transport or allow for too much water vapor loss while allowing for sufficient gas transport. The example embodiments having different densities in a selected pattern on the other hand, addresses both concerns by providing two portions with different densities.

The first portion 30 in this example has a greater density and a smaller average pore size that defines a first porosity of the first portion 30. The second portion 32 has a larger average pore size such that it has a greater porosity compared to that of the first portion 30.

The first portion 30 has a greater density and an associated lower water vapor permeability compared to the water vapor permeability of the lower density second portion 32. The first portion 30 also has a lower gas permeability compared to the gas permeability of the lower density second portion 32.

Figure 2:
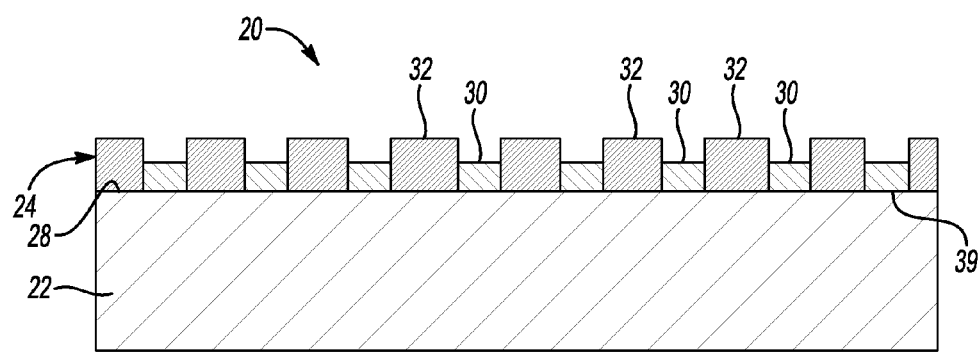
FIG. 2 is a cross-sectional, schematic illustration of another example embodiment of a fuel cell component assembly designed according to an embodiment of this invention.

The example of FIG. 1 includes a single first portion 30 and a single second portion 32. FIG. 2 illustrates another arrangement in which the first portion 30 comprises a plurality of first portion segments each having a first density and a plurality of second portion segments 32 each having a second density that is less than the first density. This example has an alternating pattern including at least one second portion segment 32 between two of the first portion segments 30. A spatial arrangement of the first portion segments 30 and the second portion segments 32 allows for distributing different microporous layer flow characteristics along the microporous layer 24. In each example the first and second portions are arranged in a preselected, ordered (i.e., non-random) pattern.

Given this description, those skilled in the art will realize how to achieve a variety of patterns for the first portion 30 and the second portion 32 along the microporous layer 24 to address the fluid flow characteristics that will optimize fuel cell performance for their particular situation.

The microporous layer 24 of the examples of FIGS. 1 and 2 can be established using a compaction method during which at least a portion of a material selected for the microporous layer 24 is compacted. In the example of FIG. 1, a compacting plate may be used to apply pressure to approximately one-half of the microporous layer material. The compaction results in the greater density of the microporous layer first portion 30. An arrangement of segments as schematically shown in FIG. 2 may be established using a press plate that has a pattern like a flow field plate such that alternating segments of the material of the microporous layer 24 are compacted to establish the greater density of the first portion 30.

One example includes applying pressure to compact at least a selected portion of the microporous layer 24 using a pressure between 100 and 800 psi.

Another example approach includes using a compaction pressure between 100 and 600 psi.

Compacting a selected portion of the microporous layer material may be accomplished by using a mechanical press or a mechanical roller, for example. By configuring the compaction machinery and its relationship to the material of the microporous layer, a variety of patterns of first portions 30 and second portions 32 may be realized to address water concentration and gas permeability requirements for a variety of fuel cell configurations.

The illustrated examples facilitate enhanced fuel cell operation during a wider variety of operating conditions. For example, high temperature, low current density conditions will not present the same challenges or shortcomings associated with fuel cell arrangements that include conventional, single density microporous layers. Varying the density of the microporous layer spatially along the microporous layer allows for varying the fluid flow characteristics along that layer in a manner that enhances fuel cell performance and addresses competing concerns that arise under a variety of fuel cell operating conditions.

For example, at high temperatures with dry inlet gases, the dominant loss is related to dry membrane and ionomer in an electrode. During high temperature operation in PEM fuel cells, the product water exists in its vapor form and can easily exit the cell without a sufficient vapor barrier. This may affect cell performance because the membrane and ionomer conductivity drops by orders of magnitude under hot and dry operating conditions. The first portion 30 of the example microporous layers 24 provides a sufficient vapor barrier without hindering gas transport along the entire microporous layer 24, which reduces vapor loss rate and increases the membrane and ionomer current density. The example microporous layers 24 optimize the density of the microporous layer to facilitate an optimal performance at high and low current operating conditions. The example microporous layers 24 provide an effective solution to obtain optimal gas and water vapor transport at high and low current operating conditions.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell component assembly, comprising:
a gas diffusion layer having a gas diffusion layer surface on one side; and
a microporous layer adjacent the gas diffusion layer, the microporous layer including:
a first portion having a first density, the first portion including a plurality of first segments; and
a second portion having a second density that is lower than the first density, the second portion including a plurality of second segments, the first portion and the second portion being arranged in a preselected pattern along the microporous layer in which each of the second segments is arranged between two adjacent first segments, the first portion contacting a first section of the gas diffusion layer surface and the second portion contacting a second section of the gas diffusion layer surface.

2. The assembly of claim 1, wherein
the first portion and the second portion define a surface area of one side of the microporous layer;
the one side is received against the gas diffusion layer surface; and
the first portion extends between one edge of the microporous layer and an interface between the second portion and the first portion.

3. The assembly of claim 1, wherein
the first density includes a first gas permeability; and
the second density includes a second gas permeability that is greater than the first gas permeability.

4. The assembly of claim 1, wherein
the first density includes a first porosity defined by a first average pore size of pores in the first portion;
the second density includes a second porosity defined by a second average pore size of pores in the second portion; and
the second average pore size is greater than the first average pore size.

5. The assembly of claim 1, wherein
the first density includes a first water vapor permeability; and
the second density includes a second water vapor permeability that is greater than the first water vapor permeability.

6. The assembly of claim 1, wherein
one edge of the gas diffusion layer is configured to be situated adjacent a fluid inlet through which fluid moves toward the gas diffusion layer.

7. The assembly of claim 1, wherein at least the first density is at least partially established by compacting a material of the first portion of the microporous layer.

8. A method of making a microporous layer for use in a fuel cell, comprising:

compacting a first portion of a microporous layer material to alter a density of at least the first portion of the microporous material to establish a first density of the first portion of the microporous layer that is higher than a second density of a second portion of the microporous layer, the first portion comprising a plurality of first segments and the second portion comprising a plurality of second segments;

arranging the first portion having the first density to contact a first section of a gas diffusion layer surface;

arranging the second portion having the second density to contact a second section of the gas diffusion layer surface which is adjacent the first section of the gas diffusion layer surface in a longitudinal direction of the microporous layer; and arranging the first portion and the second portion in a pre-selected pattern such that each of the second segments is arranged between two adjacent first segments.

9. The method of claim 8, wherein
the first density includes a first gas permeability; and
the second density includes a second gas permeability that is greater than the first gas permeability.

10. The method of claim 8, wherein
the first density includes a first porosity defined by a first average pore size of pores in the first portion;
the second density includes a second porosity defined by a second average pore size of pores in the second portion; and
the second average pore size is greater than the first average pore size.

11. The method of claim 8, wherein
the first density includes a first water vapor permeability; and
the second density includes a second water vapor permeability that is greater than the first water vapor permeability.

\* \* \* \* \*